United States Patent [19]
Kuo et al.

[11] Patent Number: 5,396,177
[45] Date of Patent: * Mar. 7, 1995

[54] BATTERY WITH ELECTROCHEMICAL TESTER

[75] Inventors: Han C. Kuo, Burlington; Ignacio Chi, Dracut; Lifun Lin, Lincoln; Louis L. Wu, Boston, all of Mass.

[73] Assignee: Duracell Inc., Bethel, Conn.

[*] Notice: The portion of the term of this patent subsequent to Oct. 5, 2010 has been disclaimed.

[21] Appl. No.: 914,900

[22] Filed: Jul. 22, 1992

Related U.S. Application Data

[63] Continuation-in-part of Ser. No. 764,610, Sep. 24, 1991, Pat. No. 5,250,905.

[51] Int. Cl.6 .......................................... G01N 27/416
[52] U.S. Cl. .................................... 324/435; 324/426; 340/636; 320/48; 429/91
[58] Field of Search ............... 324/426, 435, 104; 340/636; 320/48

[56] References Cited

U.S. PATENT DOCUMENTS

| | | | |
|---|---|---|---|
| 4,371,827 | 2/1983 | Mullersman et al. | 320/48 |
| 5,231,356 | 7/1993 | Parker | 324/435 |
| 5,250,905 | 10/1993 | Kuo et al. | 324/435 |

*Primary Examiner*—Kenneth A. Wieder
*Assistant Examiner*—Glenn W. Brown
*Attorney, Agent, or Firm*—Ronald S. Cornell; Edward M. Corcoran; Barry D. Josephs

[57] ABSTRACT

The present invention relates to an electrochemical cell and a related state of charge indicator comprising an electrochemically generated display. The state of charge indicator comprises two electrical contacts and an electrochemically generated display connected therebetween. The display comprises an electrochemical cell that may be permanently connected to a main cell in a parallel configuration via the contacts. The condition of the main cell may thus be continuously displayed on the indicator.

22 Claims, 4 Drawing Sheets

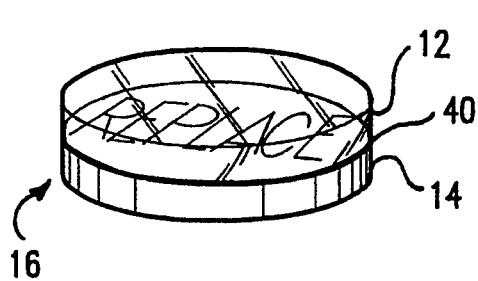
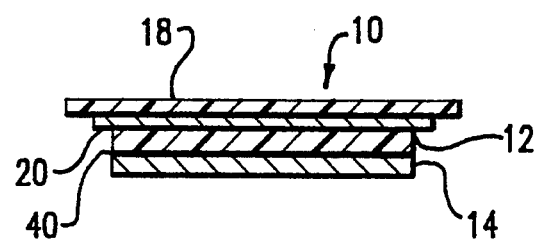
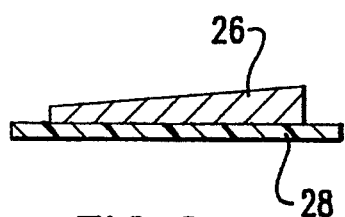
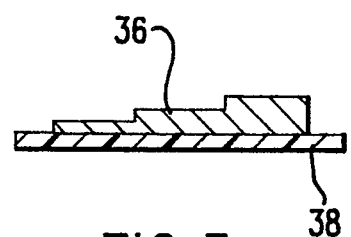
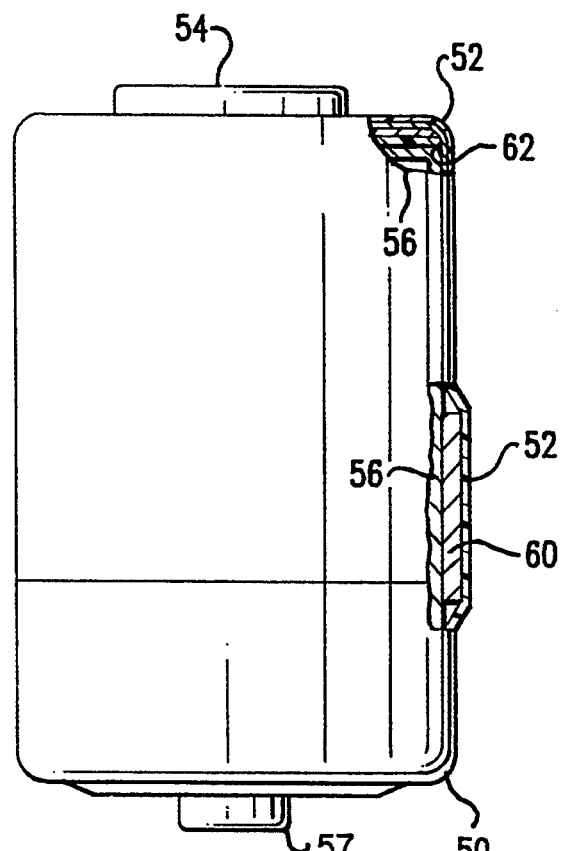

BATTERY WITH ELECTROCHEMICAL TESTER

This is a continuation-in-part of patent application Ser. No. 07/764,610, filed Sep. 24, 1991, now U.S. Pat. No. 5,250,905.

This invention relates to an improved combination of an electrochemical cell and an integrally related battery condition indicator comprising an electrochemically generated display.

Electrical primary cells which include a means for visually indicating the condition or state of charge of the cell are known. The known indication means include, but are not limited to, chemical indicators which react with materials inside the battery, chemical indicators located externally to the battery, elements embedded within an electrode that become visible during discharge, and thermochromic materials in thermal contact with a resistive element that is adapted to be connected across the battery. A problem with many of these indicators is the timing of their indication is sensitive to the construction geometry of the indicator on or within the battery. Therefore, natural variations which inherently occur during manufacture lead to variability, from battery to battery, in the time during discharge when the indication occurs.

A preferred battery tester is one which measures the voltage of a battery (main cell), since a voltage measurement, per se, is not sensitive to construction geometry. One type of tester which provides an indication that is proportional to voltage comprises a thermochromic material in thermal contact with a resistive element. Non-limiting examples of such testers are disclosed in U.S. Pat. Nos. 4,835,476, 4,726,661, 4,835,475, 4,702,563, 4,702,564, 4,737,020, 4,006,414, 4,723,656, and U.S. Ser. No. 652,165 filed Feb. 7, 1991 issued as U.S. Pat. No. 5,128,616. These testers work well for intermittent testing of a battery during its useful life. They are more difficult to permanently attach to a battery because the visual indicator is a thermochromic material. Care must be taken to thermally insulate the indicator from the battery casing in order to prevent heat transfer that would interfere with proper operation of the indicator. Additionally, these testers comprise a resistor that is connected in series with the battery during the voltage measurement. Therefore, the electrical contacts of the tester can not be permanently attached to the battery terminals in the absence of a switch, otherwise, the battery would be prematurely discharged through the tester. Several thermochromic testers are disclosed which can be manufactured already attached to a main cell as disclosed in commonly assigned U.S. patent application Ser. No. 07/730,712 filed Jul. 16, 1991 and in U.S. Pat. No. 5,059,895.

The present invention overcomes the problems associated with the above described testers by employing a battery tester comprising an electrochemically generated display that is permanently electrically connected in parallel to the battery. Heat transfer is not an issue because the principle of operation is electrochemical, not thermochromic. Premature discharge is not a problem because the electrochemical tester is connected in parallel to the battery and therefore, can not act as a series resistor. The voltage of the electrochemical cell which generates the display follows the voltage of the battery during discharge and thereby provides an accurate determination of the useful life remaining in the battery.

In particular, the present invention relates to an electrochemical cell comprising a container and a top and an integrally related state of charge indicator positioned externally both to said cell top and said container. The state of charge indicator has two electrical contacts and an electrochemically generated display connected therebetween. A first contact is permanently connected to a first cell terminal and a second contact is permanently connected to the other terminal. In a preferred embodiment the indicator has an anode active layer electrically connected to the negative terminal of the battery and a cathode active layer electrically connected to the positive terminal of the battery. The indicator is so designed that no part thereof is positioned where it could interfere with insertion of the battery in a device such as would be the case if wires or tabs were associated therewith for connecting terminals at one or both ends of a cell, and the addition of chemicals in order to operate is not required.

In one embodiment the indicator is integrally related to the cell label. In a second embodiment the condition indicator is located between the cell top and an opposing end cap.

The features and advantages of the present invention are discussed below in reference to the drawings in which:

FIG. 1A shows the electrolyte/cathode layers for the indicator cell made in accordance with the present invention;

FIG. 1B shows an indicator cell in cross section;

FIG. 2 shows an alternate embodiment of the anode layer in cross section for the indicator cell:

FIG. 3 shows another alternate embodiment of the anode layer in cross section for the indicator cell;

FIG. 4 shows an indicia layer to be used with the anodes shown in FIGS. 2 and 3; and FIG. 5 shows a battery having a permanently connected condition indicator in accordance with the invention.

Figure 5A:
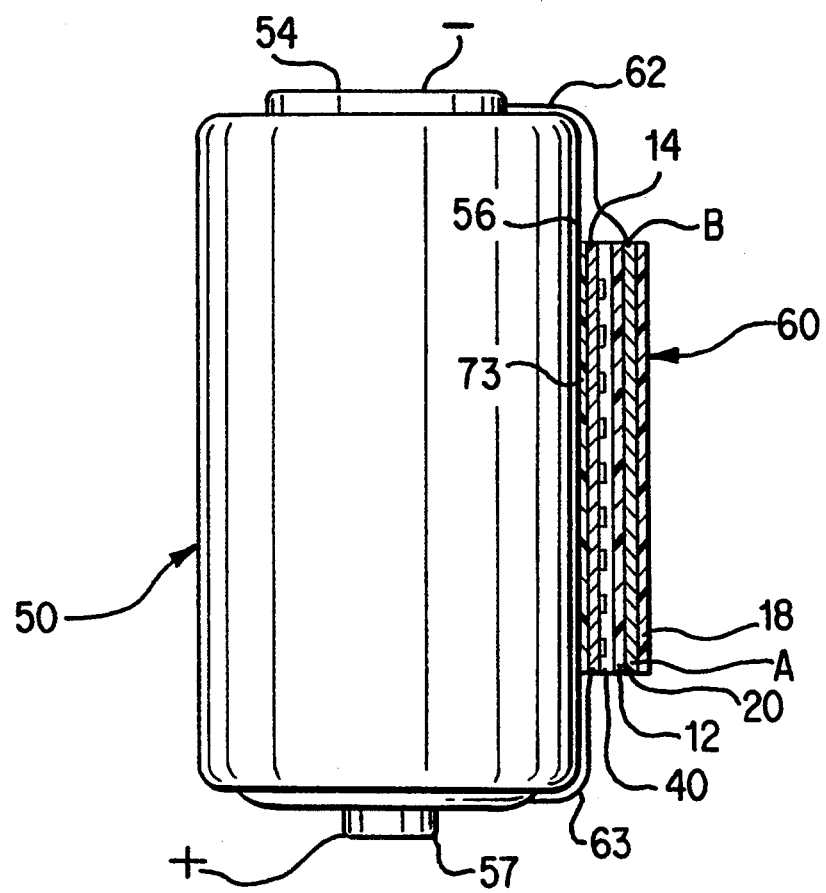
FIG. 5A shows a battery having a permanently connected condition indication with the indicator in cross-sectional view shown enlarged.

For purposes of the following discussion the electrochemical cell or battery that is being measured will be referred to as the "main cell" and the electrochemical cell that generates the display will be called the "indicator cell". In accordance with the present invention, an integrally related battery and condition indicator is constructed by permanently connecting a condition indicator comprising an indicator cell in a parallel configuration with the main cell. The indicator cell indicates the condition of the main cell using an electrochemically generated display that is constructed as follows.

The indicator cell of the invention contains a cathode active layer, and an anode active layer, and an electrolyte layer therebetween. The cathode active layer and an anode active layer are selected such that the indicator cell will have a voltage substantially similar to the voltage of the main cell, preferably just slightly less than the voltage of the main cell. This ensures that the indicator cell will be discharged when the main cell is also being discharged. The anode and the cathode of the indicator cell can be selected to be the same as the anode and the cathode of the main cell, e.g. zinc and manganese dioxide. However, an anode and cathode pair different from the main cell can also be used, provided that the voltage of the indicator cell is such that it will at least begin to discharge before the main cell voltage drops to a value that is no longer useful. Otherwise, the indicator cell would not be discharged and a display would not be generated before the end of the useful life of the main cell.

As discussed further below, the capacity of the indicator cell is much less than the capacity of the main cell. For example, the capacity of the indicator cell can be as low as 1/1000 of the capacity of the main cell. Therefore, it is preferred that the impedance of the indicator cell is at least 10 times, more preferably at least 100 times, and most preferably 1000 times the impedance of the main cell. A high impedance will cause the indicator cell to discharge at a lower rate than the main cell so that the discharge of the indicator cell is timed to coincide with the time corresponding to the useful discharge of the main cell. In fact, the impedance of the indicator cell can be specifically tailored by adding a resistor in series so that the combination of the indicator cell and resistor causes the indicator cell to discharge at a predetermined rate that is proportional to the rate of discharge of the main cell. A resistor could also be added in series with the battery to alter the impedance of the battery.

Desirably the indicator's voltage profile during discharge is also similar to the voltage profile of the main cell. Thus, the anode, cathode and electrolyte layers of the indicator cell are preferably selected to obtain such a matched voltage profile. During discharge of the indicator cell the anode and cathode are gradually electrochemically depleted. Thus, the extent of the discharge of the main cell is determined by observing the depletion of the indicator cell anode or cathode, typically by observing the disappearance of the indicator cell anode.

The preferred indicator cell is one in which the anode disappears and its disappearance creates an observable display. The display is completed by including an indicia bearing layer beneath the anode layer. The indicia may be coated as tiny granules of fluorescent material on the surface of the cathode layer at the electrolyte/cathode interface. The indicia could be a fluorescent color or convey a message to the observer, such as the word "Replace" and the like. The layers between the anode layer and the indicia should be clear so that the indicia or color is readily observable when the anode layer disappears. The amount of anode metal in the indicator cell is chosen so that enough metal is removed to reveal the indicia at a time when the main cell is approaching the end of its useful life.

The indicator cell is preferably made very thin so that it can be permanently attached to an external surface of the main cell without noticeably adding to the dimensions of the main cell. If the thickness of the indicator cell becomes significantly large, then the diameter of the main cell would have to be reduced for the overall diameter to remain about the same. This of course would cause a reduction in the capacity of the main cell. Therefore, it is desirable for the indicator cell to be made very thin. The anode, cathode and electrolyte layers which form the indicator cell may be in a stacked arrangement. More preferably, the anode and cathode layers may be laterally spaced apart from each other with the electrolyte contacting at least a portion of the surface of each. This latter embodiment provides a moving boundary during discharge whereby a "fuel gauge" effect is created. The stacked or laterally spaced apart construction for the indicator cell of the invention desirably may have a thickness of less than 100 mil (2.5 mm) but preferably may be made very thin to a thickness less than about 15 mil (0.4 mm), preferably a thickness less than about 10 mils (0.25 mm). The indicator cell thickness is typically between about 4 and 15 mils (0.1 and 0.4 mm).

Thin metal foil strips, or thin insulated wires and the like, may be used to connect the cathode to the positive terminal of the main cell and the anode to the negative terminal of the main cell. The anode layer is visible from the outside through either a transparent portion of the main cell label that is juxtaposed to the indicator cell or through a clear substrate that covers the outer surface of the indicator cell. Specific embodiments are discussed further below.

The features and advantages of the present invention will now be discussed in connection with a specific embodiment and by making reference to the drawings. A condition indicator comprising an electrochemically generated display for a "AA" size zinc/manganese dioxide alkaline cell is constructed as follows. All parts are parts by weight unless indicated otherwise.

A cathode layer for the indicator cell may be prepared by mixing manganese dioxide powder, and about 6 wt % of a conductive agent such as carbon black powder (e.g. acetylene black) and/or graphite and 5 wt % polytetrafluoroethylene powder. 200 mg of the cathode mixture is added to a round mold cavity (diameter of about 0.5 in.) having a flat bottom. A closely fitting mold die having a flat surface is inserted into the cavity and manually pressed down to compress and flatten the cathode mixture. During compression a disc-like cathode pellet having a thickness of about 20 mils (0.5 mm) is formed. The disc-like cathode pellet is then easily removed from the mold.

An anode layer for the indicator cell is preferably prepared by vapor depositing or electrochemically plating zinc metal onto a clear substrate such as polyester film. If the anode layer is electrochemically plated, the substrate is a clear conductive substrate. Such a conductive substrate may be a polyester film having a coating of indium tin oxide coated thereon, such as that designated as "Altair" M-5 film (manufactured by Southwall Technology Inc., Palo Alto, Calif.). A rectangular piece of this film is plated with zinc using a current density of 10 milliamp/cm$^2$ for about 2 to 4 minutes in a plating bath. The plating bath is formed by employing a 1 molar $ZnSO_4$ solution in $H_2O$ with the pH adjusted to 1.5 to 2 using sulfuric acid. The clear conductive layer may typically have a thickness of about 1 mil (0.025 mm) and the zinc deposited layer typically between about 0.03 and 0.04 micron. Other methods such as sputtering techniques may be employed to deposit the zinc anode layer onto a film substrate.

Referring now to FIGS. 1A and 1B, indicator cell 10 is a thin laminate containing an anode layer 20 on a film backing 18, an electrolyte layer 12 and cathode layer 14 with indicia 40 at the cathode/electrolyte interface. (The term laminate as used herein shall be defined to include layered structures which may contain film, metallic or coated layers or any combination thereof.) Indicator 10 may be assembled on battery 50 as follows: The above described cathode layer 14 may be first applied with one side facing casing 56 of battery 50. The cathode layer 14 may be electrically connected to the positive terminal 57 directly or by contacting cathode layer 14 against casing 56 which in turn is in electrical contact with positive terminal 57. If cathode layer 14 comprises a pellet as described above, it may have a thickness between about 0.3 and 1.0 mm, typically about 0.5 mm. Cathode layer 14 thickness may be reduced by employing a coating containing a cathode active material in a solvent mixture. (Preferred formulations for such coating is herein later described.) After the coating is applied, for example, directly onto casing 56, or onto a thin film such as of MYLAR polyester, the solvent may then be evaporated. The resulting thickness of the dry cathode coating 14 may be as low as 1 mil (0.025 mm) and such dry cathode coatings may conveniently be made to have thicknesses between about 1 mil (0.025 mm) and 5 mil (0.13 mm). The electrolyte layer 12, preferably the electrolytic film (herein later described), is applied onto the exposed surface of cathode layer 14. Electrolyte layer 12 may typically have a thickness between about 0.05 and 0.25 mm. Thereupon a section of polyester film 18 having zinc layer 20 plated thereon is applied with zinc layer 20 held against electrolyte layer 12. The polyester film 18 may typically have a thickness of about 0.025 mm and the zinc layer 20 thereon may typically have a thickness between about 0.03 and 0.04 microns. The zinc may cover the entire surface area of electrolyte layer 12. The zinc layer can extend beyond the surface area of the electrolyte layer, which extending portion can function as at least part of the electrical pathway for connecting the indicator cell anode to the negative terminal of the battery. The completed cell has an impedance of between about 500 and 1000 ohms. The zinc anode of the indicator cell is electrically connected to the negative terminal of a "AA" size zinc/manganese dioxide alkaline cell and the cathode is electrically connected to the positive terminal of said "AA" size cell. A resistive load is connected across the terminals of the battery. As the battery approaches the end of its useful life the zinc indicator cell anode disappears alerting the user that the battery needs to be replaced.

In contrast to the single event indicator described above the indicator cell can be designed in a manner so that it functions as a "fuel gauge". FIGS. 2 and 3 show cross section of indicator cell anode 26 and 36 having an increasing thickness from one end to the other. Such an anode would first disappear at its thin end and the thickest end would disappear last. An indicia layer 40 may be employed, for example, between electrolyte 12 and cathode 14. As the zinc anode layer 20 disappears on discharge of indicator cell 10, the indicia layer 40 becomes visible. When such an indicator cell is permanently connected to a battery the user is provided with a continuous indication of the state of charge of the battery in the same manner as the fuel gauge on a car. An alternative, but less preferred embodiment for achieving the "fuel gauge" effect is to vary the thickness of the cathode layer (similar to the anodes shown in FIGS. 2 and 3) while keeping the anode layer thickness substantially uniform.

FIG. 5 shows an embodiment of an indicator cell 60 (essentially indicator cell 10) permanently connected to battery 50. Indicator cell 60 is a laminate comprising an anode 20, electrolyte layer 12, and cathode layer 14 such as shown in FIG. 1B and may or may not include polyester film layer 18 for anode layer 20. Indicator 60 is applied to battery 50 preferably with cathode layer 14 closer to cell wall 56 than anode layer 20, e.g. as shown best in FIG. 5A. The anode layer 20 may be printed, electrodeposited, or otherwise affixed to the inside surface of cell label 52. Typically, however, anode 20, may be a thin layer of zinc deposited onto a polymeric substrate such as a polyester film 18.

Reference is now made to FIGS. 5A-8 which show several embodiments for achieving the preferred "fuel gauge" effect. As illustrated in a preferred embodiment shown in FIG. 5A indicator 60 is a thin laminate formed of anode layer 20, cathode layer 14 and electrolyte layer 12 in stacked arrangement with the electrolyte layer 12 physically contacting both anode layer 20 and cathode layer 14. The anode layer 20 of indicator cell 60 may be permanently connected to the negative terminal 54 of cell 50 by a conductive element 62 as shown in FIG. 5A. Conductive element 62 can be an extension of the deposited anode layer 20 as described above or it can be a different conductive material that is fixed to the inside surface of the label or it may be an insulated wire. If conductive element 62 is itself not insulated, then an electrically insulating layer (not shown) must also be interposed between conductive element 62 and casing wall 56, otherwise the indicator cell and battery would be short circuited. The cathode layer 14 is electrically connected to the positive terminal 57 by a wire 63 or the like (FIG. 5A) or or by directly contacting casing 56 which in turn may be in electrical contact with positive terminal 57. If cathode layer 14 contacts cell casing 56, then the anode layer 20 will disappear uniformly over its entire length during discharge of cell 60. However, cathode layer 14 may alternatively be connected at one end (A) directly to positive terminal 57 by an insulated wire 63 or the like (FIG. 5A) and may be insulated from contact with cell casing 56 by an insulating substrate 73, e.g. a polymeric film of MYLAR polyester or the like (FIG. 5A). In this latter embodiment as indicator cell 60 discharges, the anode layer 20 will begin to disappear first at point A (FIG. 5A) and then gradually from point A to point B gradually shrinking anode 20. Thus during the discharge process as more of anode 20 disappears, more of underlying indicia layer 40 becomes exposed. This conveys a "fuel gauge" effect permitting the user to determine at any time the remaining capacity of main cell 50 by simply viewing the portion of anode layer 20 remaining or by reading the message on exposed indicia layer 40. The overall thickness of indicator cell 60 (FIG. 5A) is less than 100 mil (2.5 mm), preferably less than 15 mm (0.4 mm), more preferably less than 10 mm (0.25 mm), typically between about 4 and 15 mils (0.1 and 0.4 mm).

The indicator cell 60 in the preferred embodiment of FIG. 5A may preferably have the electrolyte layer 12 formed of an electrolytic film comprising a porous polymeric film containing the liquid electrolyte solution entrapped within the porous film. The electrolyte film is herein later described in detail. Anode layer 20 (FIG. 5A) is preferably a zinc layer of thickness of between about 0.03 to 0.04 microns on backing 18 which may typically be a 1 mil (0.025 mm) thick clear MYLAR polyester film. Cathode layer 14 (FIG. 5A) may be a coating having an active cathode material and conductive agent such as a mixture of carbon black and graphite. The conductive agent preferably comprises at least 4 per cent by weight of the mixture of active cathode material and conductive agent. Preparation of the coating is discussed in detail later in the description. It is preferably applied as a solvent based coating onto polymeric substrate 73 (FIG. 5A). The coating is then dried. The dried cathode layer 14 (FIG. 5A) typically has a thickness between about 0.3 to 3 mil (0.008 to 0.08 mm), preferably between 0.5 and 1 mil (0.013 and 0.025 mm). The indicia layer 40 (FIG. 5A) may typically have a thickness together with any imprinted or coated ink layer thereon of about 1 and 2 mil (0.025 and 0.05 mm). A moisture barrier film, preferably of mica as discussed in commonly assigned U.S. patent application Ser. No. 07/914,943 (Treger) filed of even date with the present patent application, may be inserted between label 52 and indicator 60 to protect indicator 60 from exposure to deleterious amounts of ambient moisture. This patent application is herein incorporated by reference. The moisture barrier film may be adhesively secured along its border to casing 56 as described in the above referenced commonly assigned patent application. A label 56, typically of polyvinylchloride, may then be tightly applied around casing 56 and over indicator 60 to tightly encase the indicator 60 and moisture barrier against casing 56.

Figure 6:
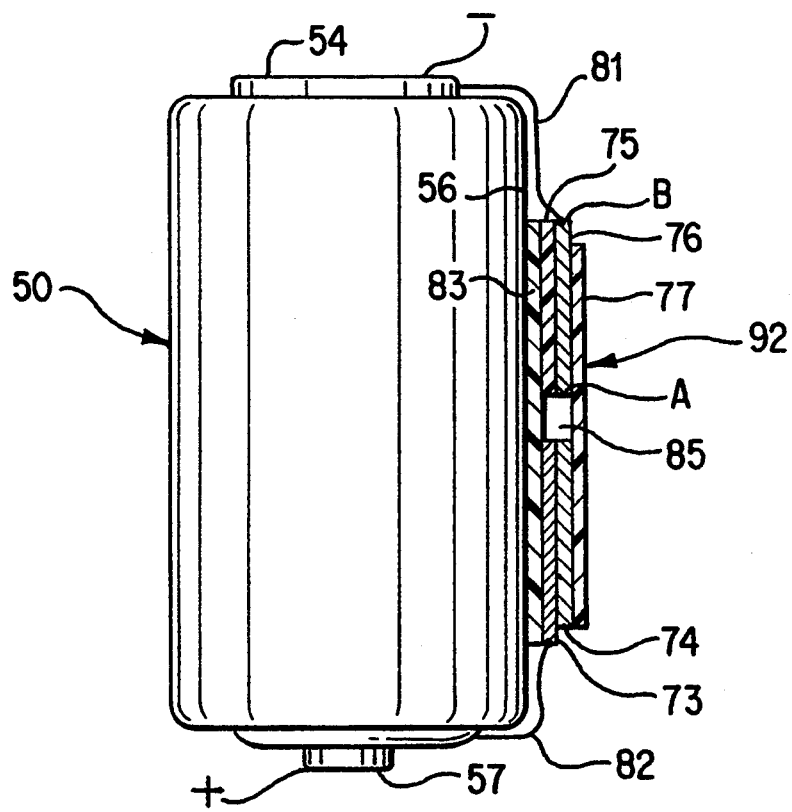
FIG. 6 shows a battery with an another embodiment of a permanently connected condition indicator with the indicator in cross-sectional view shown enlarged.

FIG. 6 shows an alternative embodiment of the indicator cell, namely indicator cell 92, which is also a thin laminate. In the embodiment shown in FIG. 6 the cathode and anode layers, 74 and 76 respectively, are laterally separated from each other instead of being in stacked arrangement as shown in FIG. 1B. Thus, in indicator cell 92, no portion of the anode active layer overlaps any portion of the cathode active layer. The electrolyte layer 77 is placed over and contacts the same side of both cathode layer 74 and anode layer 76 as illustrated best in FIG. 6. Cathode layer 74, is laterally separated from anode layer 76 by gap 85. In the embodiment shown in FIG. 6 electroyte layer 77 is placed on the side of cathode layer 74 and anode layer 76 facing away from battery 50. The battery 50 shown in FIG. 6 is representative of a conventional main cell, typically an alkaline cell, having a negative terminal 54, a positive terminal 57 and a casing 56. Casing 56 is typically in electrical contact with positive terminal 57. Indicator cell 92 may also contain a color or indicia layer 83 which may be advantageously located against casing 56 of battery 50. Color or indicia layer 83 may be a layer of colored polymeric film, for example colored polyester (MYLAR) film. Alternatively, layer 83 may be a clear polymeric film, preferably a MYLAR film which is printed on one side with a message. Preferably the imprinted side of layer 83, faces casing 56. Layer 83 also functions as an electrolyte barrier layer, that is, it prevents electrolyte from layer 77 from contacting and corroding casing 56. Layer 83 thus should be impervious to electrolyte from layer 77 and also should be sufficiently heat resistant that it does not distort when exposed to heat during conventional labeling of cell 50. Typically layer 83 together with any print layer thereon may have a thickness of between about 0.5 and 1 mil (0.013 and 0.025 mm).

Figure 8:
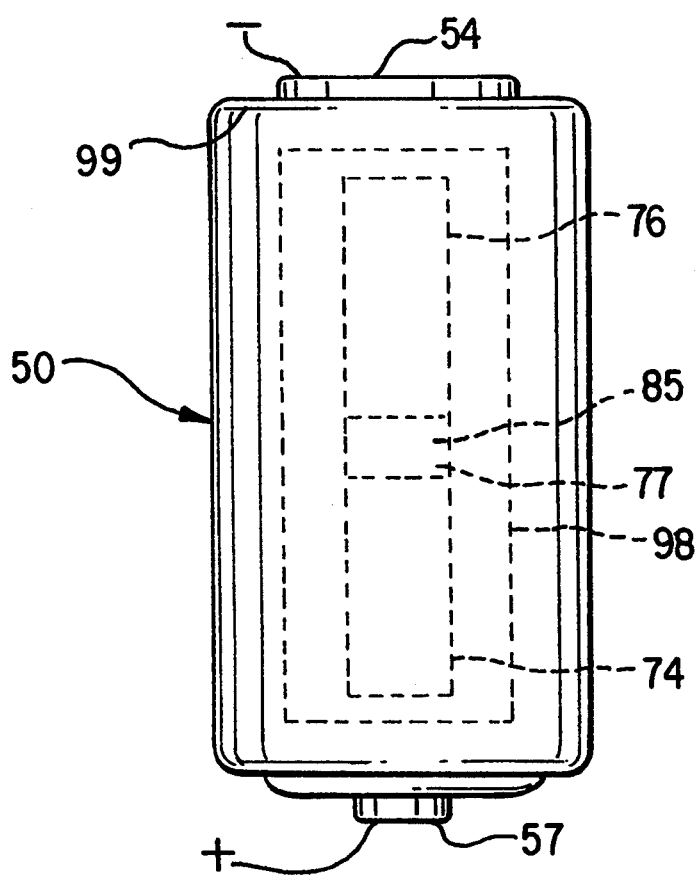
FIG. 8 shows a front elevational view of the embodiments shown in FIGS. 6 and 7.

As illustrated in FIG. 6 anode layer 76 is electrically connected to the negative terminal 54, for example by an insulated electrical wire 81. Cathode layer 74 is electrically connected to the positive terminal 57, preferably by an insulated electrical wire connecting cathode layer 74 directly to positive terminal 57 or alternatively to casing 56 which in turn is in electrical contact with positive terminal 57. Typically anode layer 76 is a thin metallic layer, for example vapor or electrodeposited zinc. In such case it is desirable to provide a backing layer, e.g. layer 75, onto which the metal may be deposited. Backing 75 is preferably a clear polyester film, e.g. a MYLAR film. As shown in FIG. 6 the backing layer 75 may contact indicia layer 83. It may be advantageous with cathode materials that are not highly conductive to employ a metallic current collector 73 in contact with cathode layer 74. Preferably current collector 73, if employed, is a thin sheet of stainless steel, aluminum or a conductive plastic which may contact the inside surface of cathode layer 74 as shown in FIG. 6. If such a current collector is employed, cathode layer 74 may be electrically connected by means of insulated wire 82 connecting current collector 73 to positive terminal 57 or casing 56. It may be desirable to employ a moisture barrier layer 98 (FIG. S) over indicator cell 92, namely over electrolyte layer 77 to protect indicator cell 92 from exposure to deleterious amounts of ambient moisture. Moisture barrier layer 98 is preferably a thin sheet of adhesively secured mica as discussed in the above cited commonly assigned U.S. patent application. Indicator 92 may be held in place against cell 50 by label 99 (FIG. 8). Label 99 may typically be a heat shrinkable protective film of polyvinylchloride applied around cell 50 and indicator cell 92. As heat is applied label 99 shrinks tightly encasing indicator 92 (and moisture barrier layer 98) against casing 56.

In operation as main cell 50 discharges, indicator cell 92 discharges in proportional amount. During discharge of indicator cell 92 the anode layer 76, typically of zinc, begins to electrochemically erode and disappear beginning at point A at the end of anode layer 76 nearest gap 85 (FIG. 6). As discharge continues gap 85 becomes greater as anode layer 76 gradually disappears from point A towards point B exposing more and more of underlying indicia layer 83. This creates a "fuel gauge" visual effect. Indicia layer 83 can be imprinted with words reflecting the extent to which main cell 50 has been depleted at any point in the discharge cycle. Electrolyte layer 77 and anode backing layer 75 are preferably clear making it easy to view indicia layer 83 as gap 85 becomes greater. The overall thickness of indicator cell 92 is less than 15 mils (0.4 mm), typically between about 4 and 15 mils (0.1 and 0.4 mm).

Figure 7:
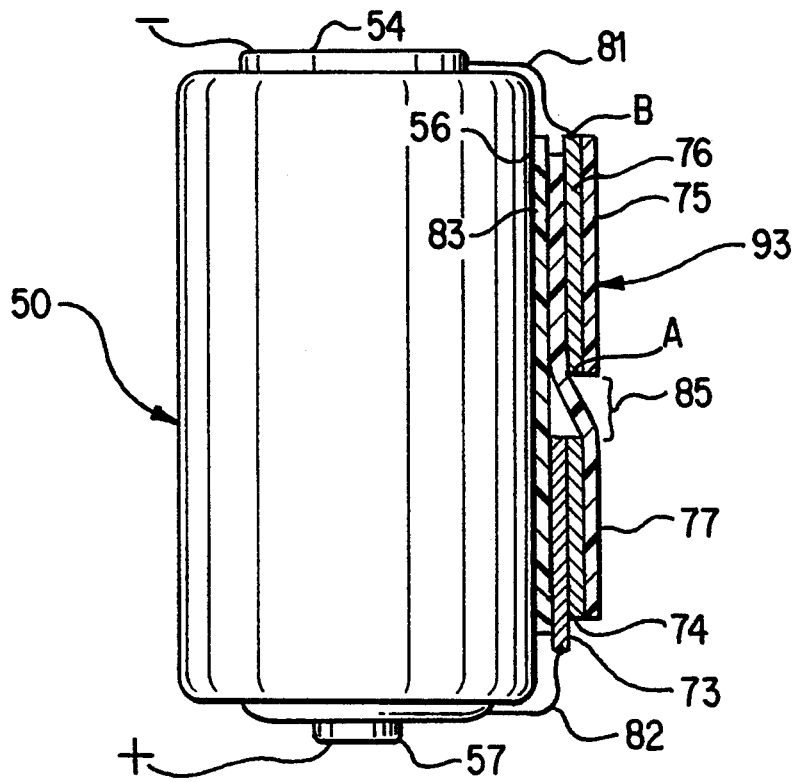
FIG. 7 shows a battery with another alternate embodiment of a condition indicator (shown enlarged) permanently connected thereto.

Another embodiment of an indicator cell of the invention having laterally spaced-apart anode and cathode active layers is represented as indicator cell 93 in FIG. 7. Indicator 93 is a laminate essentially the same as indicator 92 except that the portion of electrolyte layer 77 nearest anode layer 76 is interposed between anode layer 76 and casing 56. To accommodate this change the film backing 75 for anode layer 76 appears on the outside surface of anode layer, that is, away from casing 56, as illustrated in FIG. 7. In indicator 93 no portion of anode active layer 76 overlaps any portion of cathode active layer 74. Indicator 93 is connected in parallel to main cell 50. That is, anode layer 76 is electrically connected to negative terminal 54 preferably by insulated wire 81, and cathode layer 74 is preferably electrically connected to positive terminal 57 directly by insulated wire 82 or through a metallic current collector 73 which in turn is connected to positive terminal 57. As above described with reference to indicator 92 it is desirable to secure a moisture barrier film, preferably of mica over indicator cell 93. The moisture barrier film may be placed over indicator 93 and adhesively secured along its border to casing 56 as described in the above referenced commonly assigned patent application. Indicator 93 and any moisture barrier film thereover may be tightly held in place against casing 56 by a heat shrinkable label 99 which is fitted around main cell 50 (FIG. 8).

In operation as main cell 50 discharges, indicator cell 93 discharges in proportional amount. As indicator cell 93 discharges anode layer 76 begins to disappear gradually from the end of anode layer 76 (point A) nearest to gap 85. As in indicator 92 a "fuel gauge" visual effect is created in indicator 93 as gap 85 lengthens during the disappearance of anode layer 76, gradually, from point A towards point B. The overall thickness of indicator cell 93 is less than 100 mil (2.5 mil), preferably less than 15 mil (0.4 mm ), typically between about 4 an 15 mils (0.1 and 0.4 mm). It is surprising that so thin an indicator cell 60, 92 or 93 can be made to continually reflect the state of condiction of main cell 50.

Indicator cells 92 and 93 have anode and cathode layers which do not overlap as shown in FIGS. 6 and 7, respectively. These are preferred embodiments. However, embodiments of indicator cells 92 and 93 are possible wherein cathode and anode layers overlap and yet the indicator still obtains the "fuel gauge" effect, above described. If such an overlap configuration is employed, it is desirable to increase the resistance of the cathode layer and to take precaution that the electrolyte layer is sufficiently thick between the anode and cathode overlapped portion so that the indicator cell does not short circuit.

The anode active layer 76 for indicator cell 92 and 93 is preferably of zinc which may be vapor deposited or electrochemically plated onto a clear substrate, that is, backing 75. If plated, backing 75 is a clear conductive substrate, preferably a polyester film having a coating of indium tin oxide. The composition of the plating bath which may be employed and method of plating has already been described in the foregoing and applies in its entirety to the preparation of anode active layer 76. The thickness of anode active layer 76 may typically be between about 0.03 and 0.04 micron and the thickness of backing layer 75 may be about 1 mil (0.025 mm).

The cathode layer 74 for indicators 92 and 93 or cathode layer 14 for indicators 10 and 60 may contain any type of known cathode active material. Preferably cathode layers 74 and 14 contain a cathode active material which produces an open circuit voltage (OCV) for the indicators, which is substantially similar to the open circuit voltage of main cell 50 throughout the life of the main cell. Desirably, the cathode layers 74 for indicator 92 and 93 or cathode layer 14 for indicator 10 and 60 contain a cathode active material which produces an open circuit voltage for these indicators, which is between about 80 and 120 percent of the open circuit voltage of main cell 50 throughout the life of the main cell. If the voltage of the indicator is very low in relation to the battery voltage, the indicator will not begin to discharge early enough during the life of the battery. If the voltage of the indicator is very high in relation to the battery voltage, then corrosion problems in the indicator can develop, since the battery will tend to charge the indicator as the battery discharges. Cathode layer 74 may be applied as a solvent based coating onto a thin sheet of metallic current collector 73. The coating is thereupon dried to evaporate solvent leaving behind a thin dry coating containing the manganese dioxide. The preferred cathode layer 74 may be prepared as a coating mixture containing a) active cathode material b) a conducting agent c) a binder and d) solvent. The cathode active material preferably may include $CoO_2$, $NiO_2$, lambda $MnO_2$ or mixtures thereof. (These compounds may be produced from the chemical or electrochemical deintercalation of $LiCoO2$, $LiNiO2$, or $LiMn2O4$, respectively.) Advantageously the cathode active material contains $CoO_2$, $NiO_2$ or lambda $MnO_2$ (or mixtures thereof), alone or in mixture with a second active material selected from $LiNiO_2$, $LiCoO_2$ or $LiMn_2O_4$ (or mixtures thereof). They are desired over cathode materials containing montmorillonite (disclosed in the parent application) because they are more compatible with the preferred electrolyte layers described herein and because they can lead to thinner indicators. Specific examples of suitable cathode active material containing the above components are (parts are by weight): i) $CoO_2$, $NiO_2$ or lamda $MnO_2$, or mixtures thereof (100 wt %), ii) $CoO_2$, $NiO_2$ or lambda $MnO_2$ or mixtures thereof (100 parts) and $LiMn_2O_4$ (10 to 50 parts), iii) $CoO_2$, $NiO_2$ or lambda $MnO_2$, or mixtures thereof (100 parts) and $LiCoO_2$ (10 to 50 parts) and iv) $CoO_2$, $NiO_2$ or lambda $MnO_2$, or mixtures thereof (100 parts) and $LiNiO_2$ (10 to 50 parts). The conducting agent is preferably a mixture of carbon black powder (e.g., acetylene black) and graphite. The binder may be selected from polymeric binders such as polyacrylonitrile, polyethylene terephthalate, polybutylene terephthalate, polyvinylidene fluoride (homopolymer and copolymer) and polyvinyl fluoride. The solvent may desirably be selected from N-methyl pyrrolidinone, pyrrolidone, dimethyl formamide (DMF), acetone, acetonitrile, tetrahydrofuran, methylethylketone (MEK), tetramethyl urea, dimethyl sulfoxide, and trimethyl phosphate. A preferred cathode active layer 74 or 14 may be prepared by mixing any one of the above active cathode formulations together with the conducting agent (carbon black and graphite) into a mixed composite powder. The conducting agent may desirably comprise 2 to 50 wt % of the mixed composite powder. The binder (above indicated) is then dissolved in the solvent, typically in a weight ratio of 1 part binder to 10 parts solvent to form a binder/solvent solution. The composite powder is then mixed with the dissolved binder, typically at ambient temperature employing an electric mixer until a homogeneous (ink) mixture is formed. In application the ink mixture may be coated directly onto subtrate 73, preferably a cathode collector formed of a sheet of stainless steel or aluminum sheet of thickness between about 0.3 and 1 mil (0.008 and 0.025 mm). The stainless steel or aluminum sheet can be replaced with a non conducting polymeric film for substrate 73 of indicator 92 or 93 when the amount of conducting agent in the mixture of conducting agent and active cathode material exceeds about 10 wt %. Such a nonconducting polymeric film may for example be selected from polyester (MYLAR), polyethylene, polypropylene and fluoropolymers of thickness typically of about 1 mil (0.025 mm). The ink may be coated onto substrate 73 typically at ambient temperatures using conventional coating techniques such as by brush or spray. The coated subtrate 73 is then dried by convective air at a temperature of between about 25° and 300° C. until the solvent has evaporated. The resulting dried coating preferably has a thickness between about 0.3 and 3 mil (0.008 and 0.08 mm) and may form the cathode active layer 74 for indicator 92 and 93 or the cathode active layer 14 for indicator 60. The above described cathode coating wherein the amount of conducting agent in the mixture of conducting agent and active cathode material exceeds 10 wt % is also preferably employed for the cathode layer 14 of FIG. 5A. (Any of the cathode coatings as above described may also be employed for cathode layer 14 in indicator cell 10 of FIG. 1B.)

The electrolyte layer 12 for the indicator cell 10 or 60 or electrolyte layer 77 for indicator 92 or 93 desirably has a conductivity of at least $1 \times 10^{-7}$ ohm$^{-1}$ cm$^{-1}$ preferably between about $1 \times 10^{-4}$ and $1 \times 10^{-3}$ ohm$^{-1}$ cm$^{-1}$ and even higher and a thickness of between about 0.05 and 0.25 mm. A preferred electrolyte layer for layers 12 or 77 is an electrolytic film composed of a porous polymeric film-like matrix containing an electrolye solution composed of ionic salts dissolved in organic solvants. The ionic salts desirably have high solubility in the organic solvents and the electrolyte solution has a high boiling point so that it does not volatilize during assembly or operation of the indicator cell. Any salt that has been found useful in electrochemical cells would also be useful in the indicator cell, non-limiting examples of which include $LiCF_3SO_3$, $LiClO_4$, $Zn(CF_3SO_3)_2$, $Zn(ClO_4)$, $LiN(CF_3SO_2)_2$ and combinations thereof. The organic solvents desirably improve the electrical conductivity of the electrolyte, but primarily function as a solvent for the ionic salts and allow the electrolyte as a whole to remain liquid at ambient temperature and temperatures as low as about $-20°$ C.

The organic solvents should remain liquid during the range of operating conditions to which the indicator cell will be exposed, typically between $-20°$ C. and $54°$ C. A preferred organic solvent is composed of ethylene carbonate or propylene carbonate, preferably together in mixture. The ethylene carbonate has been determined to markedly improve the electrical conductivity of the electrolyte, while the addition of propylene carbonate assures that the electrolyte remains liquid at ambient temperature and temperatures as low as $-20°$ C.

The porous polymeric matrix is preferably a material which absorbs the electrolyte whereby a polymeric-type electrolyte is provided. Such a matrix is preferred in order to minimize or even prevent leakage of the electrolyte during storage or the usable life of the main cell. The porous polymeric matrix disirably has a high void volume to total volume ratio. The void volume is desirably at least about 50%. The polymeric matrix has a network of microscopic pores which retain the liquid electrolyte entrapped therein. The preferred polymeric matrix is a microporous film formed of polyvinylidene fluoride (PVDF). Another preferred microporous film is polyacrylonitrile. Other suitable microporous films are polyethylene, polypropylene, polycarbonate, polyethylene terephthalate, polyvinylidene chloride (SARAN), and polyester (MYLAR). These latter films may be selected depending on the geometry of the indicator cell and level of electrolyte conductivity desired. The electrolytic film, above described, has improved conductivity over the electrolytes (disclosed in the parent application) containing montmorillonite.

In preparing the electrolyte layer a mixture of about 2 parts by weight propylene carbonate to about 1 part by weight ethylene carbonate is first prepared to form the ion-solvating plastiicizer. The ionic salt selected preferably from one or more of the components aforementioned, preferably $LiCF_3SO_3$ (trifluoromethanesulfonate), is then dissolved in the organic solvents. This may typically be accomplished by stirring the salt and organic solvents together at ambient temperature using a mechanical or electric mixer, until a homogeneous electrolyte solution is obtained. The concentration of the ionic salt dissolved in the organic solvents may desirably be between about 0.5 and 1.5 moles per liter. Next polyvinylidene fluoride (PVDF) powder is added to the electrolyte solution to yield a concentration of about 27 percent by weight PVDF. The components are then mixed, typically at ambient temperature using a mechanical or electric mixer, until a homogeneous mixture is obtained. The mixture is then be heated at a temperature of about $150°$ C. for about 10 minutes, whereupon the mixture becomes a transparent solution typically of glue-like consistency. The solution is then extruded while hot by pressing it between two preheated ($150°$ C.) stainless steel plates using a pair of rollers. The resulting hot extrudate is allowed to cool to ambient temperature whereupon the polyvinylidenefluoride percipitates out of solution to form a microporous polymeric film or matrix containing the electrolyte solution entrapped therein in liquid form. The micropores typically take the form of an interconnected open cell structure. The electrolytic film containing the entrapped liquid electrolyte may be placed directly between the indicator cathode and anode layers so that it contacts all or at least a portion of each of these layers.

Indicator cell 92 or 93 should be assembled so that gap 85 between the anode and cathode layers is as short as possible without short circuiting the indicator cell. Typically the gap 85 length will be between about 0.5 mm and 13 mm, more typically about 1 mm. The assembled indicator 92 or 93 formed of the preferred anode, cathode and electrolyte layers above described may have a voltage substantially similar to the voltage of conventional alkaline cells, i.e. near 1.5 volts, making it an ideal indicator for conventional alkaline cells. Although indicator cell 92 and 93 have been described within the context of a specific embodiment, that is, attached and connected in parallel to a main cell 50, it is not intended that these indicator cells be limited to such embodiment. For example, indicator cells 92 and 93 may be assembled and offered for sale as a separate unit and connected in parallel to the terminals of a main cell 50 at a later time.

The embodiments described above are for illustrative purposes only. The specific design of the condition indicator cell will depend, of course, on the size and voltage of the associated main cell. Other embodiments for fixing the indicator cell to the main cell are, of course, possible and are intended to be within the scope of the present invention. Anodes, cathodes, and electrolytes other than those specifically described can also be used for the indicator cell and are intended to be within the scope of the invention as claimed.

What is claimed is:

1. In combination, a first electrochemical cell and a cell condition indicator wherein said first electrochemical cell comprises a casing and a positive and negative terminal and said condition indicator operates by having electrochemical activity occur therein and comprises an electrochemically stimulated display means; said indicator having a thickness of less than about 100 mils (2.5 mm); wherein the condition of the first cell is determined by observing a visible condition of said display means as the first cell is discharged.

2. The combination of claim 1 wherein said display means comprises a second electrochemical cell permanently electrically connected in parallel to said first cell.

3. The combination of claim 2 wherein said second cell has an open circuit voltage similar to the open circuit voltage of the first cell.

4. The combination of claim 3 wherein said second cell has an open circuit voltage (OCV) between about 80 and 120 percent of the open circuit voltage (OCV) of the first cell.

5. The combination of claim 2 wherein a resistor is added in series with at least one of the first electrochemical cell and the second electrochemical cell.

6. The combination of claim 2 wherein said second cell has an impedance of at least 100 times the impedance of the first cell.

7. The combination of claim 2 wherein said display means comprises a visible, electrochemically removable layer.

8. The combination of claim 2 wherein said display means comprises a cathode active layer electrically connected to said positive terminal, an anode active layer electrically connected to said negative terminal, an electrolyte layer located between at least a portion of said cathode and anode layers, wherein at least one of the cathode and anode layers is electrochemically removed during discharge of the first electrochemical cell to indicate the condition of said first cell.

9. The combination of claim 8 wherein said display means is positioned along a portion of said casing and said combination further comprises a label wrapped around the casing wherein a transparent portion of said label covers said display means, and said display means further comprises a color or indicia layer which is revealed when one of said cathode and anode active layers is electrochemically removed during discharge of the first electrochemical cell.

10. The combination of claim 8 wherein said cathode active layer comprises a compound selected from the group consisting of $CoO_2$, $NiO_2$ and lambda $MnO_2$ and said anode active layer comprises zinc.

11. The combination of claim 8 wherein said electrolyte layer comprises an electrolytic film having a conductivity of at least $1 \times 10^{-7}$ ohm$^{-1}$ cm$^{-1}$.

12. The combination of claim 11 wherein said electrolytic film comprises a porous polymeric film retaining a liquid electrolyte solution within the pores of said polymeric film.

13. The combination of claim 12 wherein said polymeric film is selected from the group consisting of polyvinylidene fluoride and polyacrylonitrile.

14. The combination of claim 12 wherein said liquid electrolyte solution comprises an ionic salt dissolved therein, said ionic salt selected from the group consisting of $LiCF_3SO_3$, $LiClO_4$, $Zn(CF_3SO_3)_2$, $Zn(ClO_4)_2$, $LiN(CF_3SO_2)_2$ and combinations thereof.

15. The combination of claim 12 wherein the electrolyte solution comprises an organic solvent selected from the group consisting of ethylene carbonate and propylene carbonate and mixtures thereof.

16. The combination of claim 11 wherein said electrolytic film comprises a polymeric film selected from the group consisting of polyethylene, polypropylene, polycarbonate, polyethylene terephthalate, polyvinylidene chloride, and polyester.

17. The combination of claim 2 wherein the cell condition indicator further comprises a barrier layer electrically insulating said anode and cathode active layers from the casing.

18. The combination of claim 2 wherein every part of the condition indicator substantially conforms to the shape of the adjacent portion of said casing.

19. The combination of claim 2 wherein said second electrochemical cell has a thickness of less than about 15 mils (0.4 mm).

20. A cell condition indicator for testing the condition of an electrochemical cell, said condition indicator being a layered structure comprising an anode active layer, a cathode active layer and an electrolyte layer contacting at least a portion of said anode and cathode active layers, said condition indicator having a thickness of less than 100 mils (2.5 mm), and said electrolyte layer comprising an electrolytic film having a conductivity of at least $1 \times 10^{-7}$ ohm$^{-1}$ cm$^{-1}$.

21. The cell condition indicator of claim 20 wherein the anode active layer comprises zinc and the cathode active layer comprises a cathode active material which produces an open circuit voltage (OCV) for said condition indicator, which open circuit voltage is similar to the open circuit cell voltage of the electrochemical cell.

22. The cell condition indicator of claim 20 wherein said electrolyte layer has a thickness between about 0.05 and 0.25 mm.

* * * * *